United States Patent
Kitou

(10) Patent No.: US 9,296,316 B2
(45) Date of Patent: Mar. 29, 2016

(54) SEAT FRAME OF CONVEYANCE SEAT

(71) Applicants: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa (JP)

(72) Inventor: Hidekazu Kitou, Seto (JP)

(73) Assignees: TOYOTA BOSHOKU KABUSHIKI KAISHA, Aichi-Ken (JP); AISIN SEIKI KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/493,894

(22) Filed: Sep. 23, 2014

(65) Prior Publication Data

US 2015/0091346 A1    Apr. 2, 2015

(30) Foreign Application Priority Data

Sep. 30, 2013    (JP) .................................. 2013-204157

(51) Int. Cl.
*B60N 2/02*    (2006.01)
*B60N 2/427*    (2006.01)
*B60N 2/42*    (2006.01)
*B60N 2/68*    (2006.01)
*B60N 2/10*    (2006.01)

(52) U.S. Cl.
CPC .......... *B60N 2/42709* (2013.01); *B60N 2/4228* (2013.01); *B60N 2/42745* (2013.01); *B60N 2/682* (2013.01); *B60N 2/02* (2013.01); *B60N 2/10* (2013.01)

(58) Field of Classification Search
CPC ........ A47C 1/025; A47C 1/026; A47C 1/035; A47C 3/00; B60N 2/02; B60N 2/10
See application file for complete search history.

(56) References Cited

U.S. PATENT DOCUMENTS

| | | | | |
|---|---|---|---|---|
| 2002/0070596 A1* | 6/2002 | Nonomiya et al. | ........... | 297/367 |
| 2002/0171280 A1* | 11/2002 | Okazaki et al. | ............... | 297/367 |
| 2005/0146187 A1* | 7/2005 | Volker et al. | .................. | 297/369 |
| 2011/0115272 A1* | 5/2011 | Kojima et al. | ............ | 297/367 R |
| 2011/0204692 A1* | 8/2011 | Holder et al. | ................. | 297/366 |

FOREIGN PATENT DOCUMENTS

| | | |
|---|---|---|
| DE | 102007013341 | 9/2008 |
| DE | 102008023943 | 11/2009 |

(Continued)

OTHER PUBLICATIONS

German Office Action for DE 10 2014 219 168.8 dated Dec. 26, 2014, along with an English-language translation thereof.

*Primary Examiner* — Phi Dieu Tran A

(74) *Attorney, Agent, or Firm* — Greenblum & Bernstein, P.L.C.

(57) ABSTRACT

A seat frame of a conveyance seat includes: a cushion frame that has cushion side frames disposed on left and right sides; a back frame that has back side frames disposed on left and right sides; recliners that serve as rotary joints, each cushion side frame and the corresponding back side frame being coupled via the corresponding recliner; and recliner plates, each recliner and the corresponding cushion side frame being coupled via the corresponding recliner plate. Each recliner plate has a bent portion at which the recliner plate is bent such that a lower portion of the recliner plate under the recliner is offset in a width direction of the seat frame relative to another portion of the recliner plate, and a reinforcing portion that enhances a strength of the lower portion in an up-down direction of the seat frame.

9 Claims, 7 Drawing Sheets

(56) References Cited

FOREIGN PATENT DOCUMENTS

| | | |
|---|---|---|
| DE | 102009002912 | 6/2010 |
| DE | 102013003867 | 9/2013 |
| JP | 2000-350637 | 12/2000 |
| JP | 2003-335162 | 11/2003 |
| WO | 2006/055616 | 5/2006 |
| WO | 2012/084117 | 6/2012 |
| WO | 2012/091431 | 7/2012 |

* cited by examiner

US 9,296,316 B2

SEAT FRAME OF CONVEYANCE SEAT

INCORPORATION BY REFERENCE

The disclosure of Japanese Patent Application No. 2013-204157 filed on Sep. 30, 2013 including the specification, drawings and abstract is incorporated herein by reference in its entirety.

BACKGROUND OF THE INVENTION

1. Field of the Invention

The invention relates to a seat frame of a conveyance seat.

2. Description of Related Art

Japanese Patent Application Publication No. 2003-335162 (JP 2003-335162 A) describes a seat frame serving as the frame of an automobile seat (hereinafter referred to as a seat) in which an energy absorbing portion for a rear collision is provided in a cushion frame under a recliner so that the other portions of the seat frame are less likely to be deformed at the time of the rear collision.

SUMMARY OF THE INVENTION

In some seats, there are cases where it is difficult to provide the energy absorbing portion described above due to the structure of the seat. The invention provides the seat frame of a conveyance seat in which a coupling portion of the recliner and the cushion frame can absorb energy when the seat receives a load from the rear of the seat, and flexibility in the design of the seat frame is thereby enhanced.

An aspect of the invention relates to a seat frame of a conveyance seat including: a cushion frame that has cushion side frames disposed on left and right sides; a back frame that has back side frames disposed on left and right sides; recliners that serve as rotary joints, each cushion side frame and the corresponding back side frame being coupled via the corresponding recliner; and recliner plates, each recliner and the corresponding cushion side frame being coupled via the corresponding recliner plate. Each recliner plate has a bent portion at which the recliner plate is bent such that a lower portion of the recliner plate under the recliner is offset in a width direction of the seat frame relative to another portion of the recliner plate, and a reinforcing portion that enhances a strength of the lower portion in an up-down direction of the seat frame. According to the present aspect, the recliner plate is bent at the bent portion and the energy absorbing portion is thereby formed, and bending when the bent portion absorbs energy is suppressed by the reinforcing portion of which the strength in the up-down direction of the seat frame is enhanced. As a result, it is possible to perform energy absorption when the seat receives the load from the rear of the seat using the recliner plate that couples the recliner and the cushion side frame. Consequently, it is possible to enhance the flexibility in the design of the seat frame.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
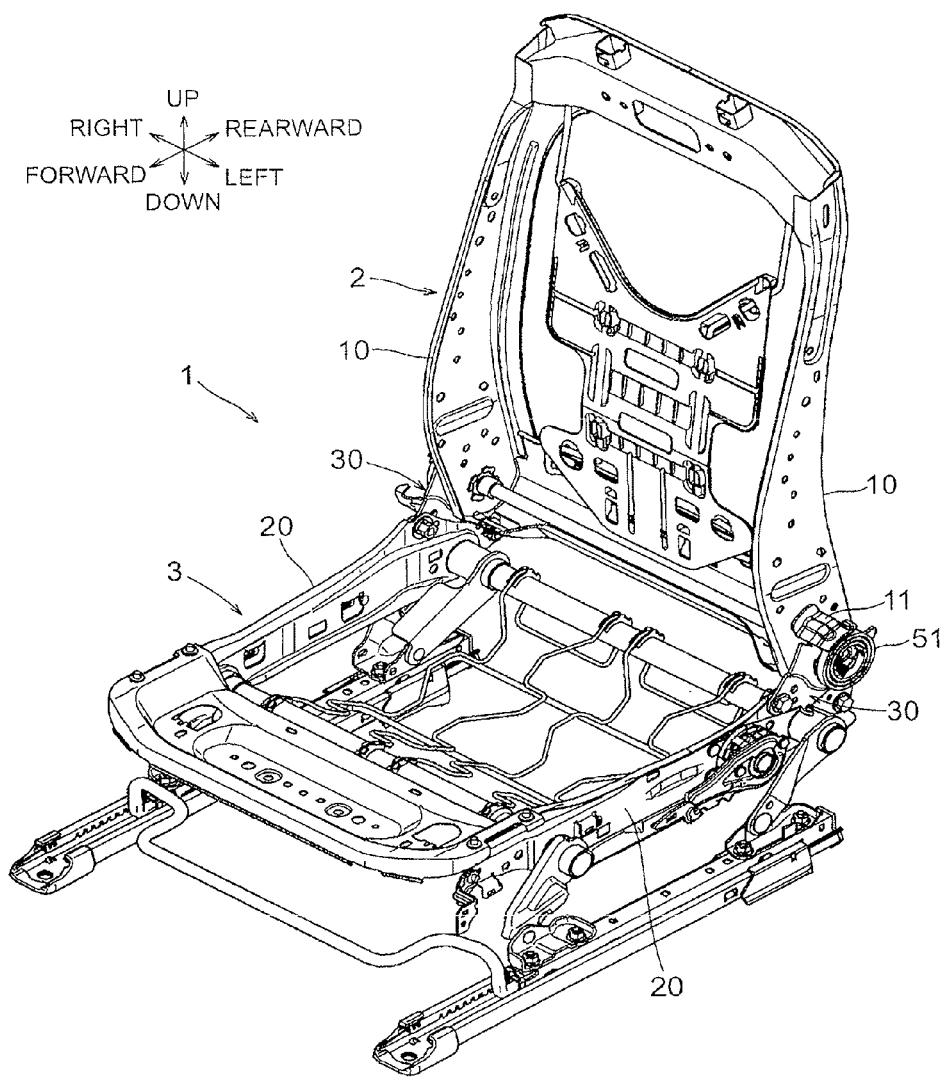
FIG. 1 is a perspective view of an embodiment of the invention.
Figure 2:
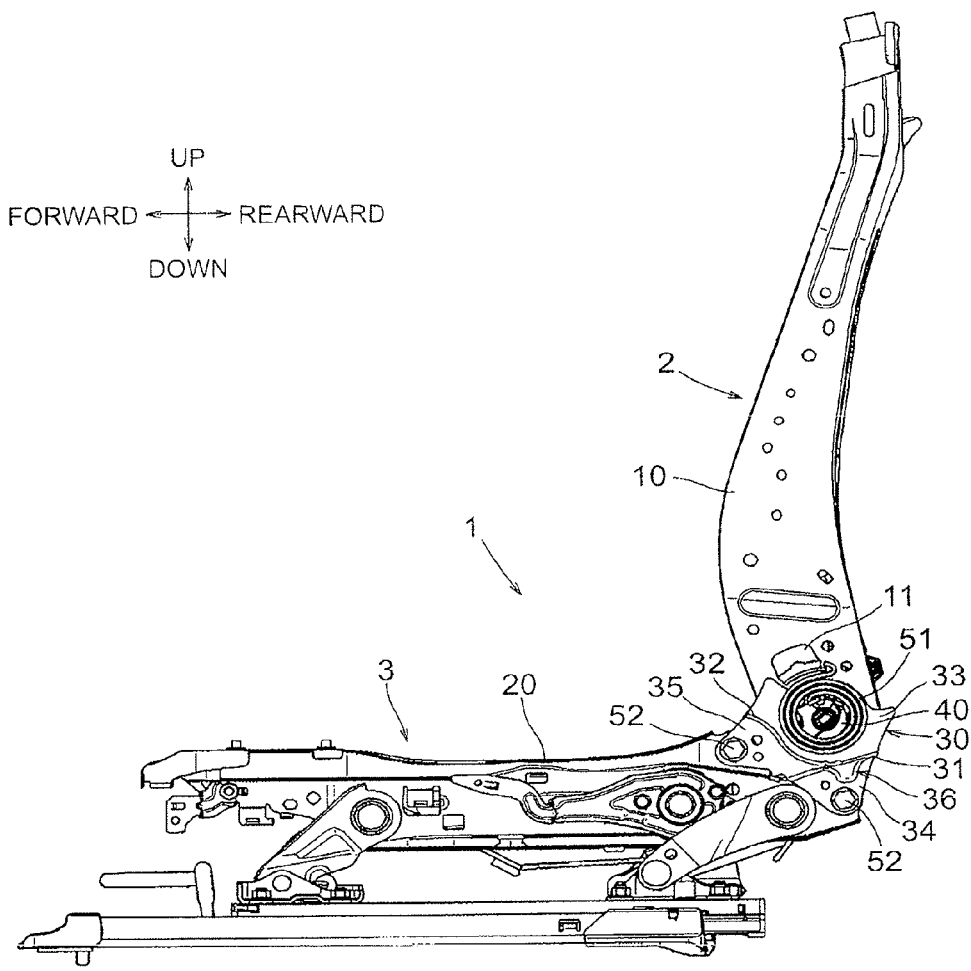
FIG. 2 is a left side view of the embodiment.
Figure 3:
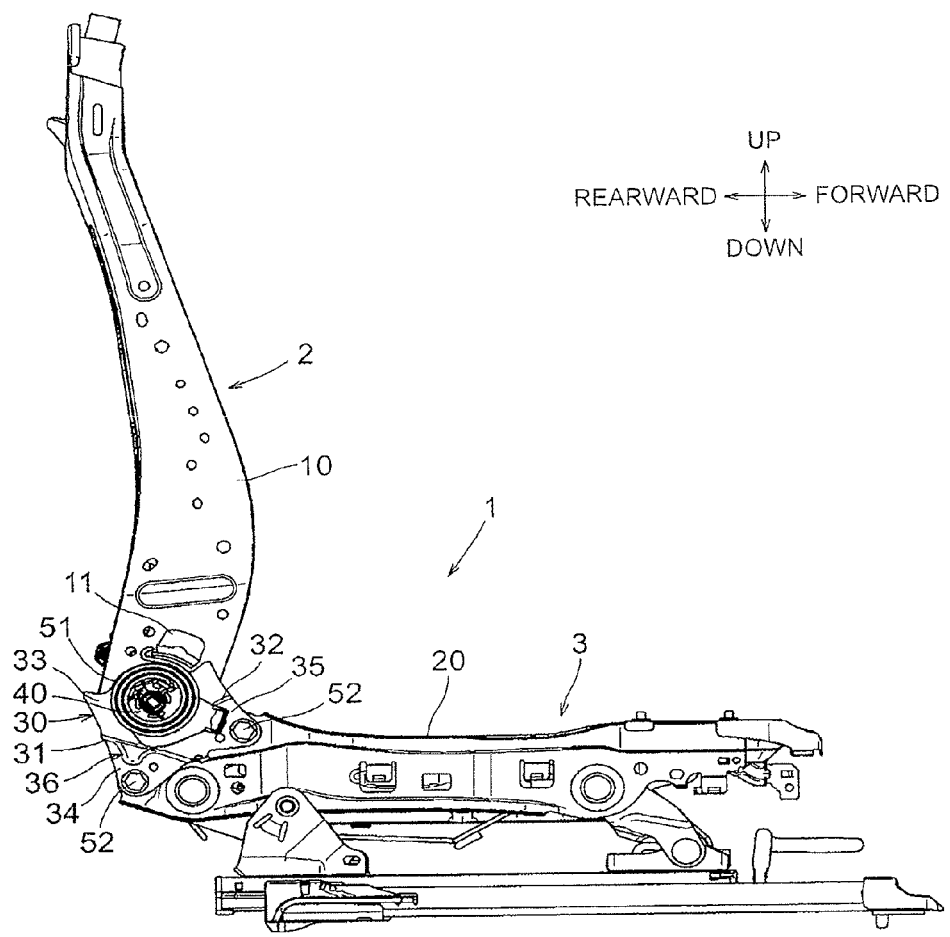
FIG. 3 is a right side view of the embodiment.
Figure 4:
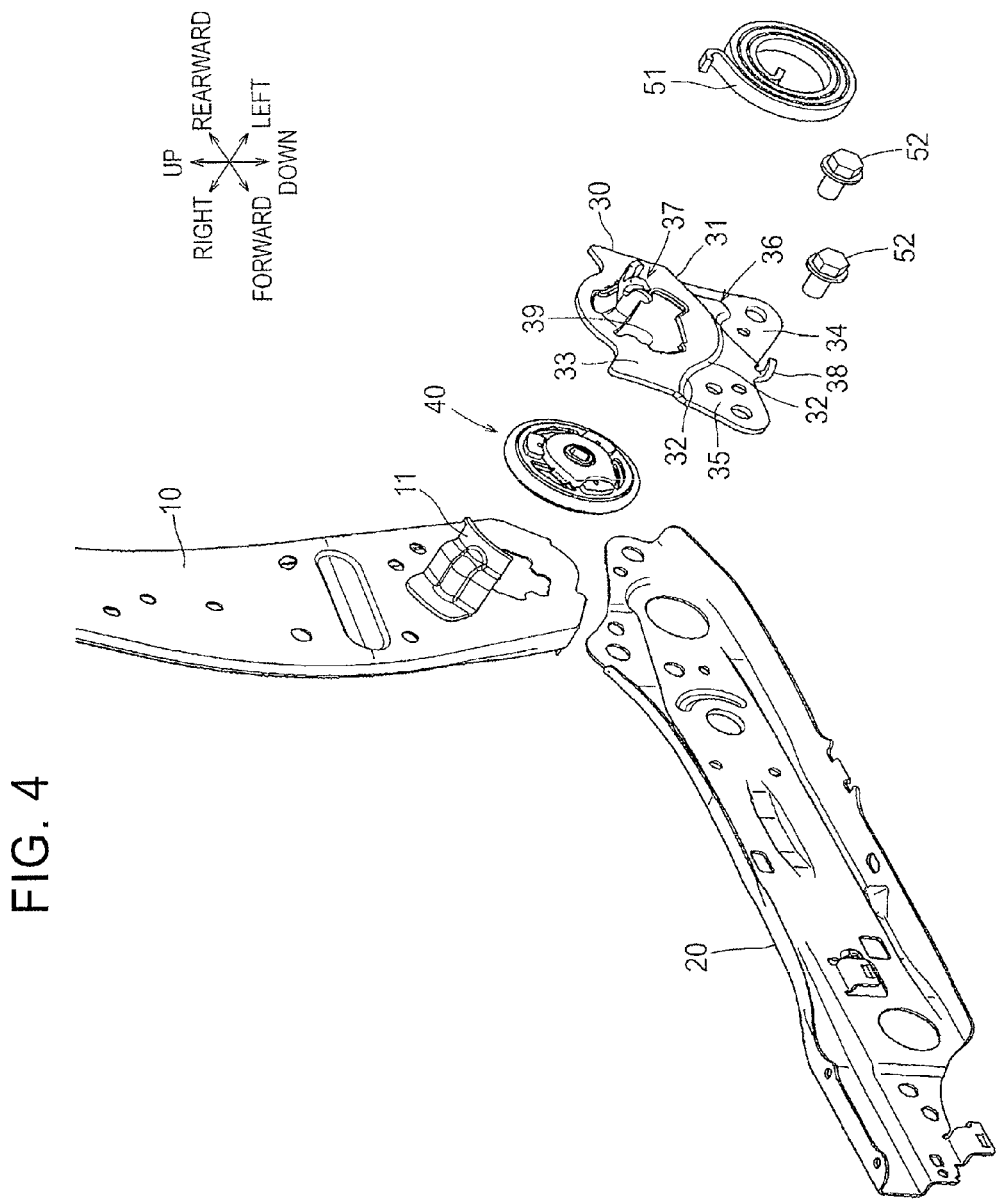
FIG. 4 is an exploded perspective view of a principal portion of the invention in the embodiment.
Figure 5:
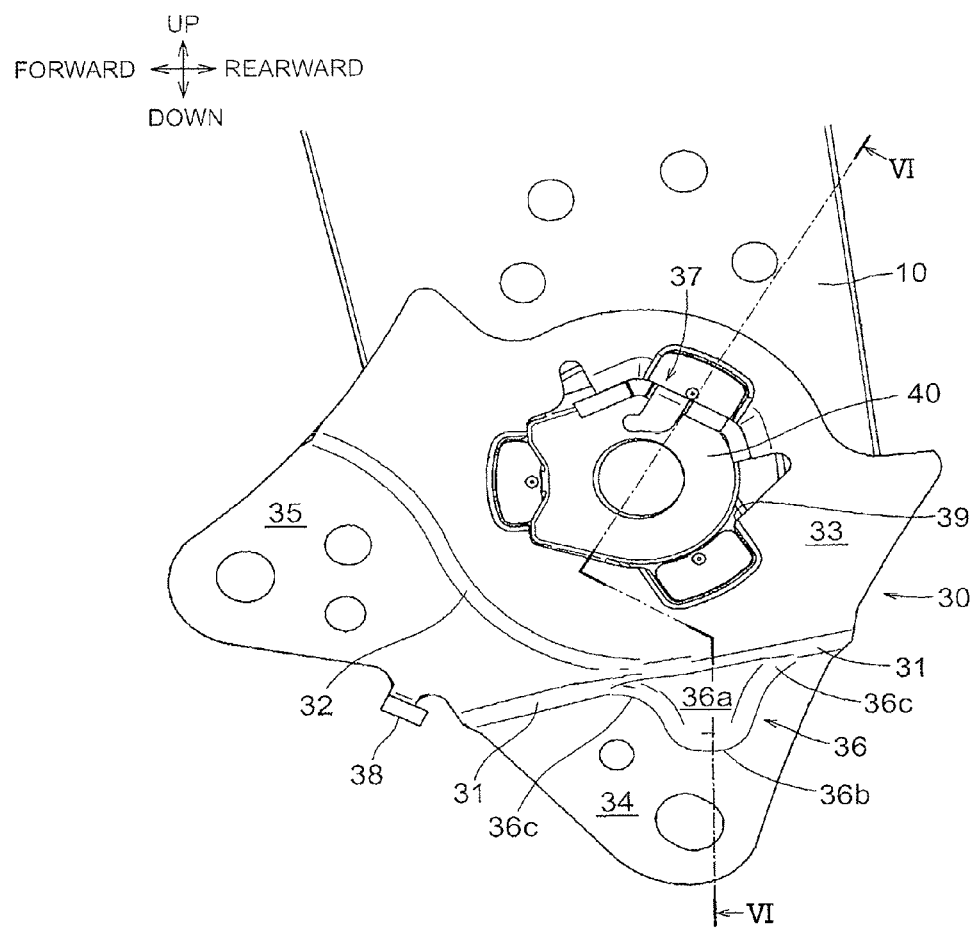
FIG. 5 is an enlarged side view of the principal portion of the invention in the embodiment.
Figure 6:
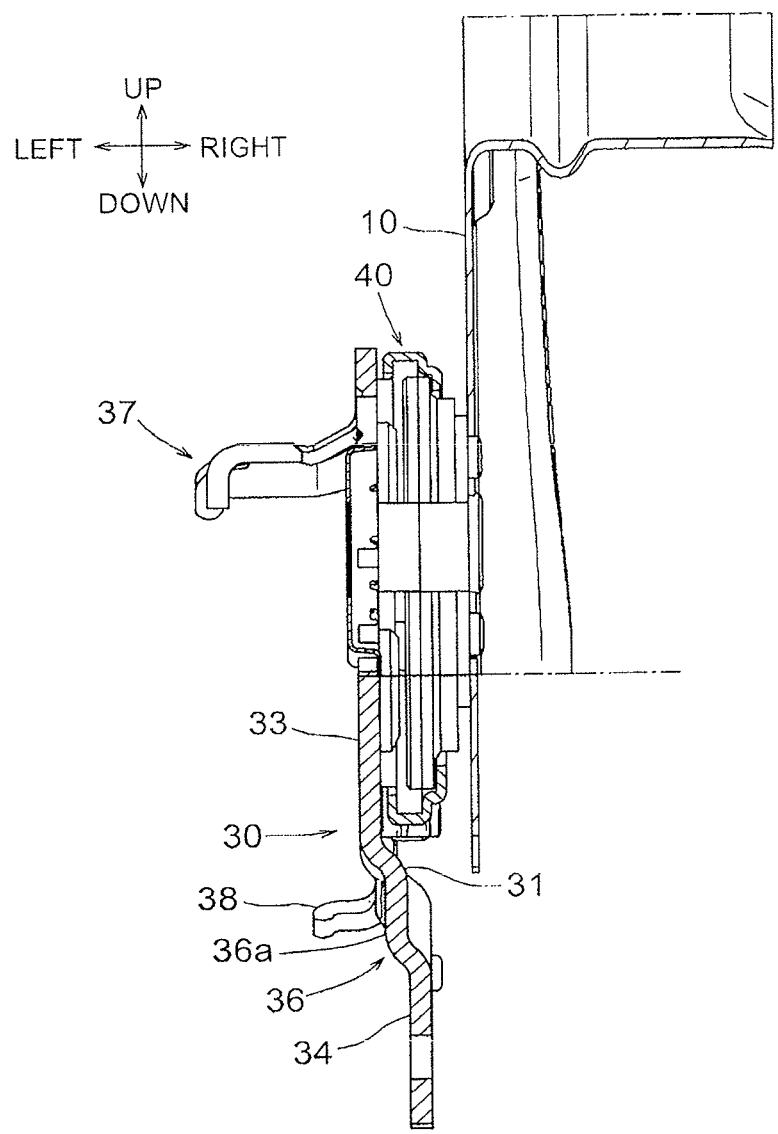
FIG. 6 is a cross-sectional view taken along the line VI-VI of FIG. 5.
Figure 7:
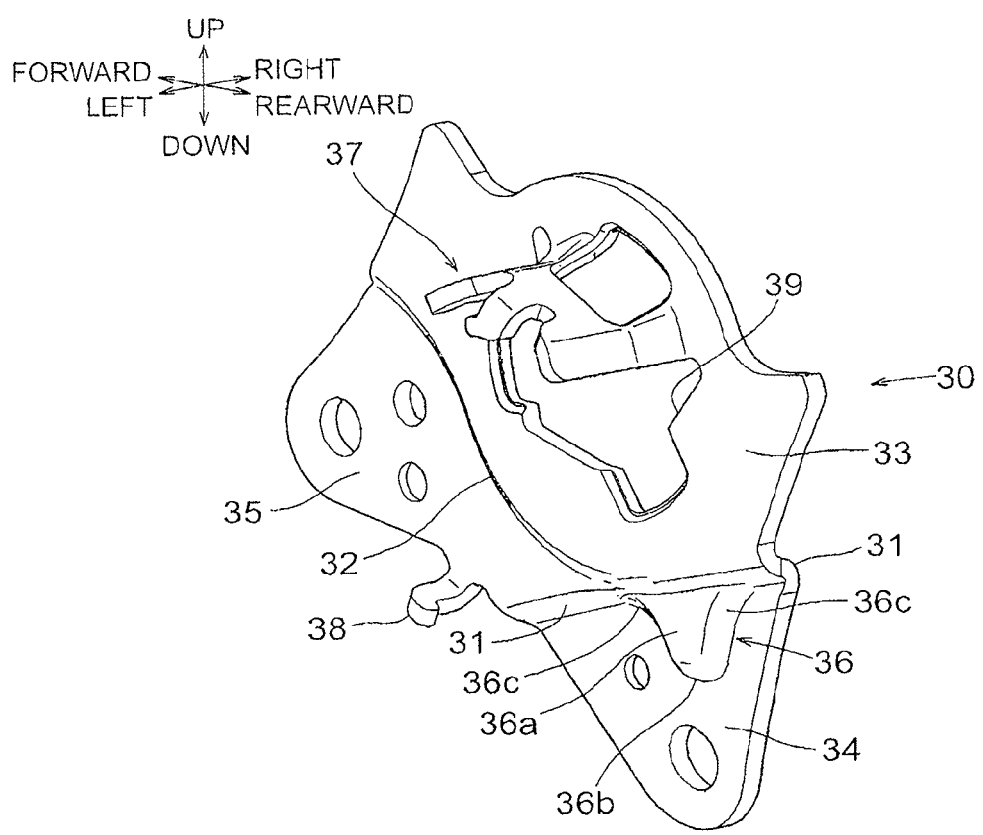
FIG. 7 is an enlarged perspective view of a recliner plate in the embodiment.

FIGS. 1 to 7 show an embodiment of the invention. The embodiment shows an example in which the invention is applied to an automobile front seat (hereinafter simply referred to as a seat). In each drawing, directions of the seat are indicated by arrows. In the following description, the description related to the directions will be made by using the above directions as references. A seat frame 1 serving as a frame of the seat includes a cushion frame 3 and a back frame 2. Cushion side frames 20 are disposed on left and right sides of the cushion frame 3, and back side frames 10 are disposed on left and right sides of the back frame 2. The seat frame 1 further includes recliners 40 serving as rotary joints and recliner plates 30. Each cushion side frame 20 and the corresponding back side frame 10 are coupled to the corresponding other via the recliner 40. With this, the back frame 2 pivots about the recliners 40 relative to the cushion frame 3 in a forward-rearward direction, and an inclination angle of a seat back (back frame 2) can be thereby adjusted. Specifically, the recliner plate 30 is coupled to a rear end portion of the cushion side frame 20 using a bolt 52. In addition, the back side frame 10 is coupled to a seat center side (a side opposite to the outside) of the recliner plate 30 via the recliner 40. The recliner 40 and the recliner plate 30 are welded together with a convex portion of the recliner 40 fitted in a fitting hole 39 in a central portion of the recliner plate 30. The recliner 40 and the back side frame 10 are welded together with the convex portion of the back-side recliner 40 fitted in a fitting hole of the back side frame 10.

Each recliner plate 30 has a first bent portion 31 and a second bent portion 32. In side views such as FIGS. 2 to 4, the recliner plate 30 is bent at the second bent portion 32 such that a portion of the recliner plate 30 positioned obliquely forward of and under the recliner 40 is offset toward the center in a width direction (left-right direction) of the seat frame 1 relative to the other portion of the recliner plate 30, and the recliner plate 30 has an upper plate 33 over the second bent portion 32 and a middle plate 35 under the second bent portion 32. Similarly, the recliner plate 30 is bent at the first bent portion 31 such that a portion of the recliner plate 30 positioned obliquely rearward of and under the recliner 40 is offset toward the center in the width direction of the seat frame 1 relative to the other portion of the recliner plate 30, and the recliner plate 30 has the upper plate 33 and the middle plate 35 over the first bent portion 31 and a lower plate 34 under the first bent portion 31. Specifically, the second bent portion 32 is formed so as to be curved along the outline of the recliner 40. On the other hand, the first bent portion 31 is formed so as to extend in the forward-rearward direction in side views such as FIGS. 2 to 4 and, specifically, the first bent portion 31 is formed so as to extend along a substantially straight line that is inclined upward by about 5 degrees in a rearward direction. The upper plate 33 and the middle plate 35 are formed with the second bent portion 32 and the upper plate 33 and the middle plate 35 are offset outwardly in the width direction, whereby a gap between the upper plate 33 and the side frame 10 can be appropriately provided such that the recliner 40 can be received between the recliner plate 30 and the back side frame 10. That is, by changing the height of the upper plate 33 in the width direction of the seat frame 1 and/or the height of the middle plate 35 in the width direction thereof, it is possible to provide the recliner plates 30 respectively fitted to a plurality of types of the recliners 40 having different thicknesses. In addition, in the present embodiment, when the seat receives a load from the rear due to a rear collision of an automobile, the recliner plate 30 is deformed at the first bent portion 31, and the deformation of the other portions in the seat frame 1 is thereby prevented. That is, when the seat receives the load from the rear, the back frame 2 is pushed rearward by a passenger in the seat, a load is applied downward to the recliner plate 30, which fixes the back frame 2 to the cushion frame 3, from the recliner 40, and the recliner plate 30 is bent and deformed at the first bent portion 31.

A raised portion 36a is formed at a position obliquely rearward of and under the recliner 40 in the lower plate 34 of the recliner plate 30. A bead (convex portion) 36 as a reinforcing portion includes the raised portion 36a. The raised portion 36a is obtained by raising a portion of the lower plate 34 outwardly in the width direction by press working. The height of the raised portion 36a from the lower plate 34 is set to be smaller than the height of the middle plate 35 from the lower plate 34. In addition, the bead 36 is formed into a mountain shape having a portion of the raised portion 36a connected to the first bent portion 31 as a base portion 36c and a portion farthest from the first bent portion 31 as a top portion 36b. Since the bead 36 is formed in this manner, when the seat receives the load from the rear due to the rear collision and the recliner plate 30 is deformed at the first bent portion 31, the bead 36 operates to suppress the deformation and control the deformation amount such that the deformation does not become excessively large.

According to the embodiment described thus far, the recliner plate 30 is bent at the first bent portion 31 and an energy absorbing portion is thereby formed, and the degree of the bending when the bent portion 31 absorbs energy is controlled by the bead 36 provided at the first bent portion 31. As a result, it is possible to perform the energy absorption when the seat receives the load from the rear of the seat using the recliner plate 30 that couples the recliner 40 and the cushion side frame 20. As a result, it is possible to enhance flexibility in the design of the seat frame 1. For example, even in the case where a required energy absorbing structure cannot be secured in the other portions of the seat frame 1, it becomes possible to absorb the energy when the seat receives the load from the rear of the seat using the recliner plate 30.

In addition, the raised portion 36a formed on the lower plate 34 is formed into the mountain shape having the base spreading toward the first bent portion 31. Accordingly, when the seat receives the load from the rear of the seat, it is possible to effectively receive a compressive load applied to a portion between the upper plate 33 and the lower plate 34 with the first bent portion 31 interposed therebetween using the bead 36, and suppress the bending of the first bent portion 31. Further, by appropriately adjusting the dimension corresponding to the height of the mountain of the raised portion 36a formed in the mountain shape (the distance between the first bent portion and the top portion 36b), the dimension corresponding to the spread of the base (the width of the base portion 36c), and the height of the raised portion 36a from the lower plate 34, it is possible to optionally control the degree of the energy absorption.

The recliner plate 30 is formed so as to be bent at the first bent portion 31 with the lower plate 34 depressed toward the center of the seat. As a result, the protrusion amounts of the recliner plate 30 toward the right side and the left side are small. Accordingly, the seat frame according to the invention is advantageous in the case where the seat is disposed at a place having a narrow width in a left-right direction. Recent automobiles tend to be reduced in height and the attachment position of the seat is inevitably lowered, and as a result, the lower portion of the seat may be positioned in a region having a width in the right-left direction reduced by the base portion of a floor tunnel extending along the forward-rearward direction at the center of the automobile. At this point, as described above, in the case where the protrusion amounts of the recliner plate 30 toward the right side and the left side are small, it is possible to attach the seat to a low position and meet to the request to reduce the height of the automobile.

Note that a first engaging piece 37 is integrally provided with a peripheral edge portion of the fitting hole 39 of the recliner plate 30, and the first engaging piece 37 protrudes outward in the left-right direction of the seat. A second engaging piece 38 is integrally provided with a lower end portion of the middle plate 35, and the second engaging piece 38 protrudes outward in the left-right direction of the seat. An inner end portion of a spiral spring 51 is engaged with the first engaging piece 37, and an outer end portion of the spiral spring 51 is engaged with a spring bracket 11 fixed to the outside of the lower portion of the back side frame 10 by welding. Accordingly, the back frame 2 is constantly biased by the spiral spring 51 so as to fall forward. An end portion of a seat cover (not shown) provided to cover the cushion frame 3 is engaged with the second engaging piece 38.

Although the specific embodiment has been described thus far, the invention is not limited to the appearance and the configuration of the embodiment, and various changes, additions, and deletions may be made without changing the scope of the invention. For example, in the recliner plate 30 of the embodiment described above, although two types of the bent portions are provided and the middle plate 35 is formed in addition to the upper plate 33 and the lower plate 34, only one type of the bent portion may be provided and the middle plate 35 may not be formed. In addition, although the recliner plate 30 of the embodiment described above is bent at the first bent portion 31 and the second bent portion 32 such that the lower plate 34 and the middle plate 35 are offset toward the center in the width direction of the seat frame 1, the recliner plate 30 may be bent such that the lower plate 34 and the middle plate 35 are offset outwardly in the width direction of the seat frame 1. Further, in the embodiment described above, although the outer surface of the raised portion 36a of the head 36 is formed into a flat surface, the outer surface may also be formed into an inclined surface with the height from the lower plate 34 that is gradually reduced from the side of the base portion 36c of the raised portion 36a in the mountain shape toward the side of the top portion 36b thereof. In the embodiment described above, although the invention is applied to the automobile seat, the invention may also be applied to seats mounted on conveyances such as a plane, a ship, and an electric train.

As detailed above, an aspect of the invention relates to a seat frame of a conveyance seat including: a cushion frame that has cushion side frames disposed on left and right sides; a back frame that has back side frames disposed on left and right sides; recliners that serve as rotary joints, each cushion side frame and the corresponding back side frame being coupled via the corresponding recliner; and recliner plates, each recliner and the corresponding cushion side frame being coupled via the corresponding recliner plate. Each recliner plate has a bent portion at which the recliner plate is bent such that a lower portion of the recliner plate under the recliner is offset in a width direction of the seat frame relative to another portion of the recliner plate, and a reinforcing portion that enhances a strength of the lower portion in an up-down direction of the seat frame.

The reinforcing portion may be provided so as to control an increase in bending amount at the bent portion of the recliner plate when the reinforcing portion receives a downward load from the recliner. The reinforcing portion may include a raised portion that is a portion of the recliner plate under the bent portion, the portion being raised toward a side opposite to the bent portion in the width direction. In this case, the reinforcing portion may be formed into a mountain shape having a portion of the raised portion adjacent to the bent portion as a base, and a portion apart from the bent portion as a top. According to the above configuration, since the reinforcing portion includes the raised portion formed on the portion of the recliner plate under the bent portion and is formed into the mountain shape having the base spreading toward the bent portion, when the seat receives the load from the rear of the seat, it is possible to effectively receive a compressive load acting such that the recliner plate is bent at the bent portion using the reinforcing portion, and suppress bending of the bent portion. Further, by appropriately adjusting the dimension corresponding to the height of the mountain of the raised portion in the mountain shape, the dimension corresponding to the spread of the base, and the height of the raised portion, it is possible to desirably control the degree of the energy absorption. In addition, the bent portion may extend in a forward-rearward direction of the seat frame.

What is claimed is:

1. A seat frame of a conveyance seat, comprising:
   a cushion frame that has cushion side frames disposed on left and right sides;
   a back frame that has back side frames disposed on left and right sides;
   recliners that serve as rotary joints, each cushion side frame and the corresponding back side frame being coupled via the corresponding recliner; and
   recliner plates, each recliner plate being coupled to the corresponding cushion side frame and the corresponding recliner so as to couple the corresponding cushion side frame and the corresponding recliner, wherein
   each recliner plate has a bent portion at which the recliner plate is bent such that a lower portion of the recliner plate under the recliner is offset in a width direction of the seat frame relative to another portion of the recliner plate, and a reinforcing portion that strengthens the lower portion in an up-down direction of the seat frame, and
   each recliner plate is positioned on an outer side of the corresponding recliner in the width direction of the seat frame.

2. The seat frame of a conveyance seat according to claim 1, wherein the reinforcing portion is provided so as to control an increase in bending amount at the bent portion of the recliner plate when the reinforcing portion receives a downward load from the recliner.

3. The seat frame of a conveyance seat according to claim 1, wherein the reinforcing portion includes a raised portion of the recliner plate under the bent portion, the raised portion being raised toward a side opposite to the bent portion in the width direction.

4. The seat frame of a conveyance seat according to claim 3, wherein the reinforcing portion is a parabolic shape having a portion of the raised portion adjacent to the bent portion as a base, and a portion apart from the bent portion as a vertex.

5. The seat frame of a conveyance seat according to claim 1, wherein the bent portion extends in a forward-rearward direction of the seat frame.

6. The seat frame of a conveyance seat according to claim 1, wherein the bent portion is bent such that a lower-most portion of the recliner plate in the up-down direction of the seat frame and under the recliner is offset in the width direction of the seat frame relative to an upper-most portion of the recliner plate in the up-down direction of the seat frame.

7. The seat frame of a conveyance seat according to claim 1, wherein each recliner plate is coupled to the corresponding side frame by a bolt at a rear end portion of the corresponding side frame.

8. The seat frame of a conveyance seat according to claim 1, wherein each recliner plate is welded to the corresponding recliner.

9. The seat frame of a conveyance seat according to claim 7, wherein each recliner plate is welded to the corresponding recliner.

* * * * *